(12) United States Patent  
Carney et al.

(10) Patent No.: US 9,269,078 B2  
(45) Date of Patent: Feb. 23, 2016

(54) METHOD AND SYSTEM FOR ASSOCIATING A CONTACT WITH MULTIPLE TAG CLASSIFICATIONS

(75) Inventors: Mark D. Carney, Sterling, VA (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 687 days.

(21) Appl. No.: 13/092,441

(22) Filed: Apr. 22, 2011

(65) Prior Publication Data

US 2012/0271957 A1    Oct. 25, 2012

(51) Int. Cl.
*G06F 15/16*    (2006.01)
*G06Q 10/10*    (2012.01)
*H04L 12/58*    (2006.01)

(52) U.S. Cl.
CPC ............ *G06Q 10/107* (2013.01); *H04L 12/589* (2013.01); *H04L 51/36* (2013.01)

(58) Field of Classification Search
CPC ....... H04L 51/04; H04L 12/581; H04L 51/36; H04L 12/589; H04L 61/1564; H04L 12/2496; H04L 12/1813
See application file for complete search history.

(56) References Cited

U.S. PATENT DOCUMENTS

| | | | |
|---|---|---|---|
| 8,358,762 B1 * | 1/2013 | Renner et al. ............ 379/202.01 |
| 2006/0009249 A1 * | 1/2006 | Fu et al. ......................... 455/518 |
| 2008/0172363 A1 * | 7/2008 | Wang et al. ........................ 707/3 |
| 2009/0089316 A1 * | 4/2009 | Kogan et al. .......... 707/E17.005 |
| 2010/0125580 A1 * | 5/2010 | Westen et al. ................. 707/737 |

* cited by examiner

*Primary Examiner* — Thomas Dailey
*Assistant Examiner* — Nam Tran

(57) ABSTRACT

An approach for enabling multiple tag associations to be used for classifying a contact identifier is described. A first tag is associated with a contact identifier for grouping into a first classification; and a second tag is associated with the contact identifier for grouping into a second classification. Storage of the first tag and the second tag is initiated along with the contact identifier as part of a contact list.

18 Claims, 12 Drawing Sheets

METHOD AND SYSTEM FOR ASSOCIATING A CONTACT WITH MULTIPLE TAG CLASSIFICATIONS

BACKGROUND INFORMATION

Service providers and device manufacturers are continually challenged to deliver value and convenience to consumers by providing compelling network services and advancing the underlying technologies. One area of interest has been the development of services and technologies for enabling device users to catalog content such as e-mail, chat messaging, calendar entries, photo sharing and the like. For example, a user of a messaging or chat application may tag contacts they communicate with in various ways, such as by category or type (e.g., friend, client, prospect, etc.). By tagging, the user can more readily organize their contact lists, thereby facilitating the ease of communications with the contacts. For example, the user can send an email to all friends, or all co-workers to inform them of some relevant event. Traditionally, the capability to designate these tags are inflexible with respect to assignment of the tags, thereby likely to discourage use of such tags all together.

Based on the foregoing, there is a need for an approach to tagging that is flexible and conducive to communicating with contacts.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for enabling multiple tag associations to be used within an application for classifying a contact identifier are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to the application of tags for classifying contact identifiers for use within software applications, it is contemplated that these embodiments have applicability to any data protocols, methodologies or systems for enabling the classification of any content, including graphic content, audio content, application content, web based content and the like.

Figure 1:
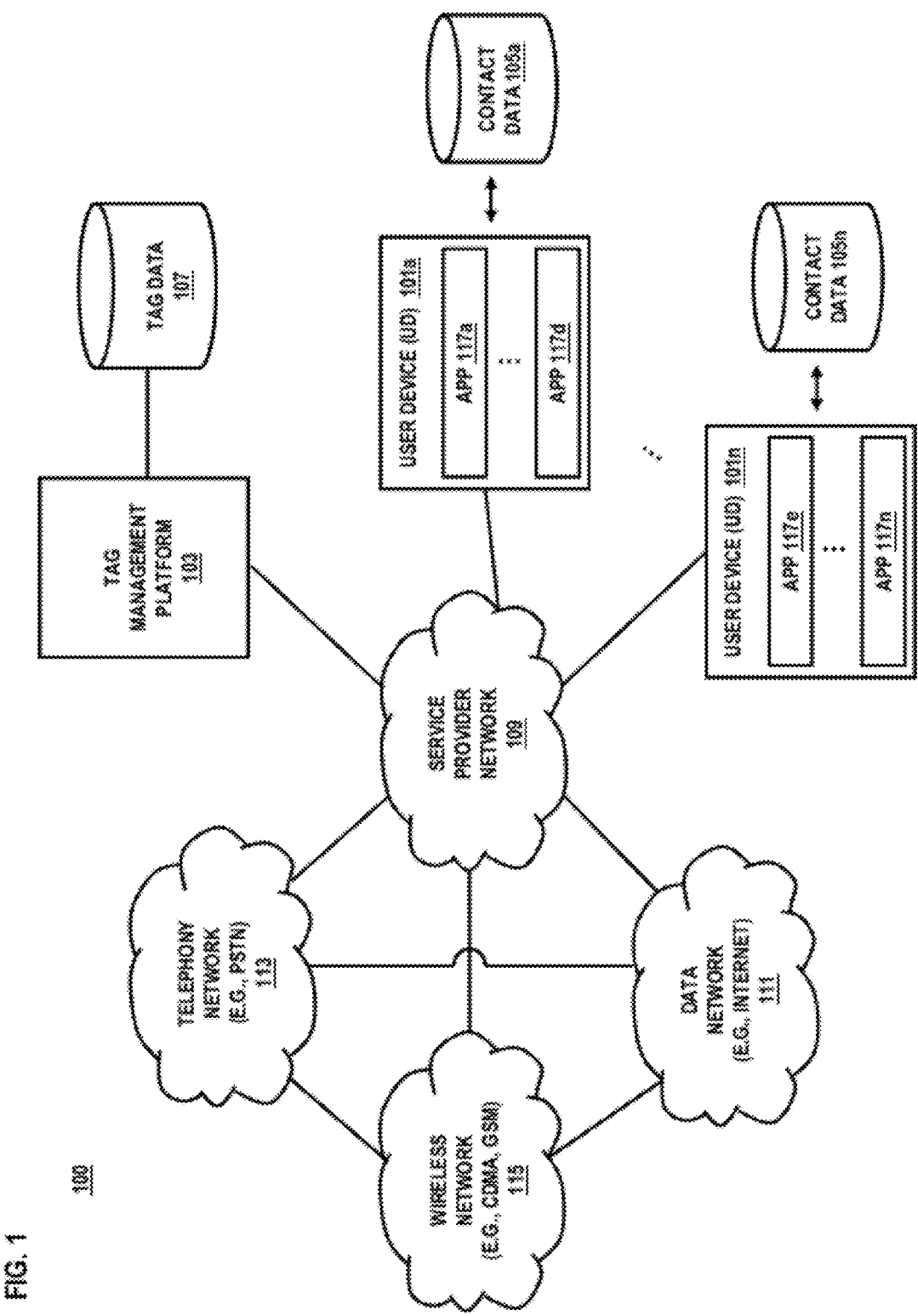
FIG. 1 is a diagram of a system for enabling multiple tag associations to be used for classifying a contact identifier, according to one embodiment.

FIG. 1 is a diagram of a system for enabling multiple tag associations to be used for classifying a contact identifier, according to one embodiment. For the purposes of explanation, system 100 is shown to include one or more user devices 101a-101n (e.g., mobile device, smart phone, netbook, laptop, set-top box, or any communications enabled computing device), which are configured with one or more applications 117a-117n. The applications are configured to process content, such as contact data 105a-105n, for enabling various computing tasks, communication tasks, group interaction tasks, media processing tasks and other actions to be performed. Applications executable by user devices 101a-101n—i.e., those that rely upon contact data 105a-105n (e.g., contact list information, contact identifier, etc.)—may include social networking applications, chat applications, e-mail applications, simple messaging service (SMS) applications, phone applications, photo sharing and image processing applications, media player applications, word processing applications, contact management applications, network communication applications, conferencing applications, directory applications, etc. Associating a tag with a contact identifier permits additional metadata to be provided, thus enabling the identifier to be contextually rich and more readily distinguishable. Conventionally, applications only enable a contact identifier to be classified with one tag at a time. The use of multiple tags or sub tags for enhancing a user's ability to associate a contact with multiple different classifications to support enhanced application use is not supported.

In certain embodiments, user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the UDs 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, contact data (or contact identifier) can include any information for identifying, profiling or indicating a person, place, object or resource associated with a particular application task, process or event. By way of example, contact data may be maintained at the user device 101a-101n, generated by an application 117a-117n, or a combination thereof for indicating a contact number, e-mail address, user profile (e.g., a user name, location), resource profile (e.g., an IP address of a computer, name of a meeting room, details of a data service), physical address, graphic data, business data, affiliations, web-based resources, etc.

In addition, the contact data may include or is associated with additional data, i.e., metadata, for providing contextual detail regarding a person, place, object or resource, including notes, document attachments, certifications, identification numbers, entity names, department names, etc. Of note, contact data may be referenced by applications 117a-117n by way of contact identifier. According to some embodiments, contact identifiers may include any portion of the contact data in whole or in part, for identifying a specific set of contact data, such as a name, address, identification value, picture, symbol, affiliation, etc. Hence, a single contact identifier may be associated with multiple different phone numbers, email addresses, mailing addresses (etc., work, home, office) and other contact data. It is noted herein, for illustration purposes, that the contact data 105a-105n is inclusive of, or synonymous with, a contact identifier.

Typically, a user of a voice call application, a video call application, a messaging application or a chat application may also include or associate a tag with a particular contact identifier. In certain embodiments, tags can include data objects, labels or metadata used for classifying a set of contact data by category, type, use or context (e.g., friend, client, prospect, work related, etc.). As mentioned, the ability to associate a tag with an identifier provides contextually rich (and more readily distinguishable) contact data as compared with typical identifiers. For example, a user of a chat application may classify a contact identifier relating to a co-worker with a "Co-Worker" tag, an identifier for a resource such as a conference bridge with a "Bridge Line" tag and an identifier for a meeting room with a "Room 101" tag. Generally, tags can be customized and assigned by the user, or presented for selection as one or more default tags by the application 117a-117n.

As noted, traditional applications only enable a contact identifier to be classified using one tag at a time—e.g., one group identifier. This one-to-one relationship between a contact identifier and a tag limits the range of use and effectiveness of the applications 117a-117n, which rely upon these data to support their execution. For example, even though a contact identifier for a particular person is best classified according to multiple tags based on expertise, functional organization, interest or roles and relationship with the user of a device 101a-101n, only a single tag is capable of being assigned (e.g., "Friend" but not "Co-Worker"). At best, the user can include note data, color coding or other means of denoting the unique relationship they share with that person, but is limited in their ability to quickly identify contacts based on their myriad of classifications for perform chatting, web conferencing and other applications. This inability to efficiently delineate between contacts to accommodate different roles, relationships and contexts results in the user having to select contacts individually from the contact list, increases the time and effort required of the user. This can act as a deterrence to assigning tags in the first place.

To address this issue, system 100 presents a tag management platform 103 for associating multiple tags to a single contact identifier. In addition, the system 100 provides an approach for enabling an application 117a-117n to recommend the association of a tag with a contact identifier based on a determined relationship between the contact identifier, a tag associated with the contact identifier, or one or more tags for other contact identifiers. By way of example, the tag management platform 103 operates in connection with or on the user devices 101a-101n, whereby applications 117a-117n can assign multiple classifications with a particular contact identifier. The tag management platform 103 also facilitates storage of the multiple tags along with the contact identifier to the tag database 107. The contact identifier is then made available for access from a contact list by the applications 117a-117n according to multiple classifications.

In one embodiment, a contact featuring multiple classifications by way of association with multiple tags is retrieved in response to the establishment of a communication session, group interaction session, content sharing session or the like. By way of example, a communication application such as a chat application, e-mail application, or phone application, may reference a particular one of the multiple tags associated with a contact identifier. Under this scenario, only the tag or set of tags relevant to the communication session is selected accordingly, thus streamlining the ability of the calling application to reference the most relevant contact given the context of the communication. The tag management platform 103 can provide any one of the user devices 101a-101n with the capability to conduct sessions via multiple tagged contact identifiers over a communication network using, for example, wireless communications.

While shown as a separate entity, it is contemplated in certain embodiments that the tag management platform 103 may be integrated with the respective applications 117a-117n of the user devices 101a-101n. For example, the tag management platform 103 may be implemented as an executable service, one or more executable modules, or a combination thereof for direct use by the operating system (OS), application programming interfaces (APIs), libraries and/or functional elements of the user devices 101a-101n and/or applications 117a-117n. As such, the tag management platform 103 may generate input signals via the circuitry of the user device 101 for influencing operation of the device 101. Under this scenario, additional menu items, selection options, action buttons, data fields and other features may be included within the applications 117a-117n for enabling referencing or processing of multiply tagged contact identifiers from a contact list (e.g., contact data 105a-105n).

In one embodiment, the classification processing capability afforded by the tag management platform 103 is offered by a service provider as a managed (internal) or hosted (external) solution, such as for supporting web based or network based communication applications that are executable by respective user devices 101a-101n. By way example, a company could use their corporate directory (lightweight directory access protocol (LDAP), web-based, etc.) as a tag management platform 103 so that employees can add logical and functional tag groups as-needed.

According to certain embodiments, user devices 101a-101n, the tag management platform 103, the applications 117a-117n operable by user devices 101a-101n and other elements of system 100 may be configured to communicate via a service provider network 109. In some embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router. According to exemplary embodiments, user devices 101a-101n may include any customer premise equipment (CPE) capable of sending and/or receiving information over one or more of networks 109-115—e.g., set-top box. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc. Further, computing device may be any suitable computing device, such as a VoIP phone, skinny client control protocol (SCCP) phone, session initiation protocol (SIP) phone, IP phone, personal computer, softphone, workstation, terminal, server, etc.

Figure 2:
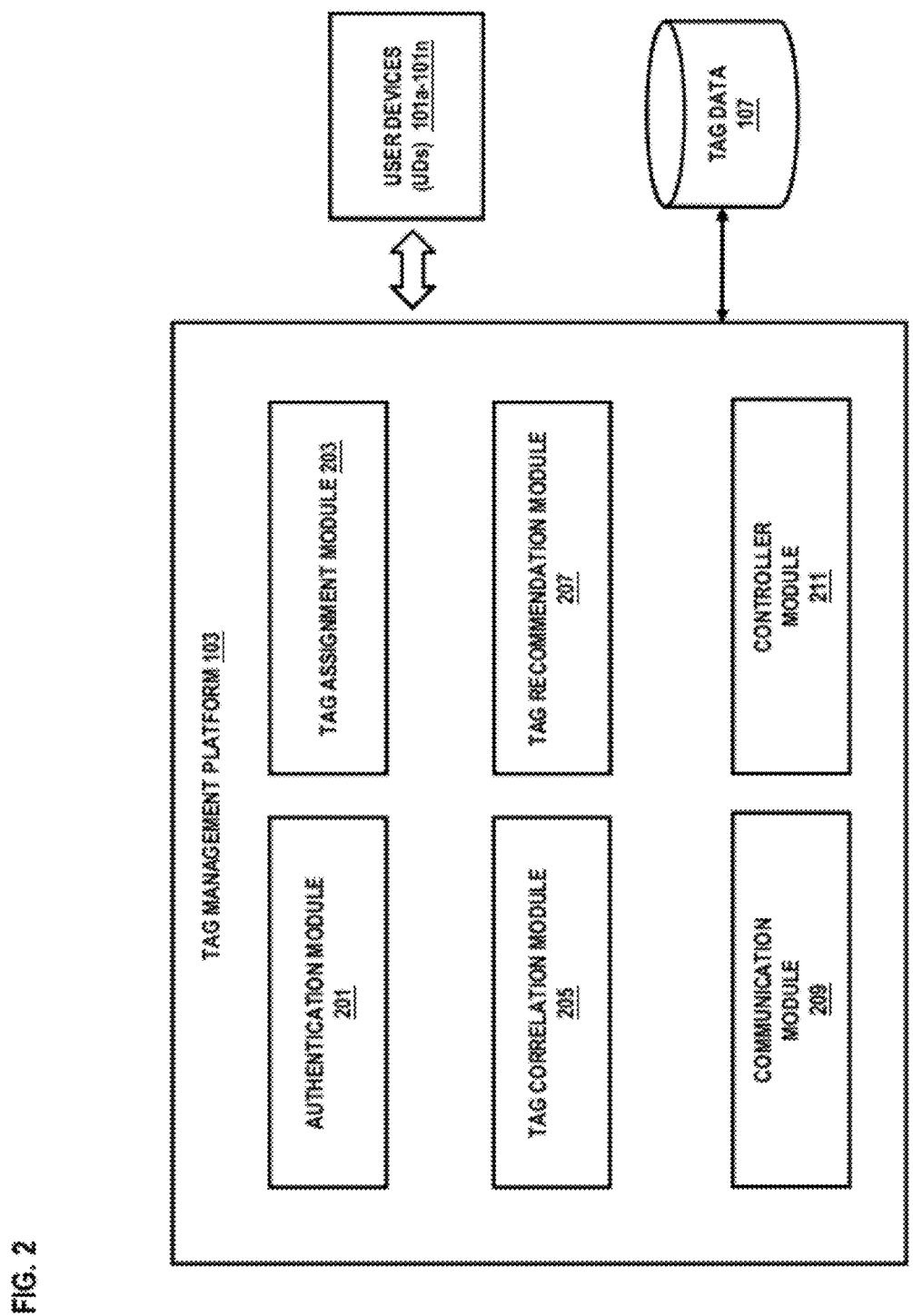
FIG. 2 is a diagram of a tag management platform for enabling multiple tag associations to be used for classifying a contact identifier, according to one embodiment.

FIG. 2 is a diagram of a tag management platform for enabling multiple tag associations to be used for classifying a contact identifier, according to one embodiment. The tag management platform 103 includes various executable modules for performing one or more computing, data processing and network based instructions that in combination provide a means of enabling tag creation and referencing by an application that utilizes contact list information. Such modules can be implemented in hardware, firmware, software, or a combination thereof. By way of example, the tag management platform 103 may include an authentication module 201, tag assignment module 203, tag correlation module 205, tag recommendation module 207, communication module 209 and controller module 211.

In addition, the tag management platform 103 also accesses tag data from a tag database 107; the database being configured to maintain tags associated with one or more contact identifiers. The tag data 107 may be linked, for example, to contact data (e.g., lists, directories) as maintained by the one or more user devices 101a-101n. As mentioned previously, the tag management platform 103 may be implemented for operation by the one or more user devices 101a-101n, accessible by the user devices 101a-101n via a communication link, or a combination thereof. For example, in one embodiment, a communication module 209 enables formation of a session over a network 109 between the tag management platform 103 and the applications of respective user devices 101a-101n. The applications may formulate sessions directly or by way of a browser application or web portal via the user interface supported by the application 117a-117n. In certain embodiments, the communication module 209 executes various protocols and data sharing techniques for enabling collaborative execution between a user device 101a-101n (e.g., mobile devices, laptops, smartphones, tablet computers, desktop computers) and the tag management platform 103 over the network 109.

In one embodiment, a tag assignment module 203 is configured to enable users to assign, create and associate tags to a specific contact identifier maintained in a contact list (e.g., as contact data 105a-105n). The tag assignment module 203 also facilitates storing of multiple tags of differing classification with a single contact identifier to a contact list. By way of example, the tag assignment module 203 is configured to interact with the operating system (OS), application programming interfaces (APIs), libraries and/or functional elements of a user device 101 and/or application 117 of the device for generating menu items, selection options, action buttons, data fields and other features for selecting or assigning tags to a contact identifier. The tag assignment module 203 may also be configured to access one or more contact lists maintained locally or remotely for facilitating an association between one or more tags and a particular contact identifier. Once assigned, tags may be forwarded to the user device 101 or online resource that maintains the contact list.

It is noted that the tag assignment module 203 may operate in conjunction with an authentication module 201 for managing the appropriate access rights and permissions for accessing the contact data (e.g., lists, directories) to be associated with one or more tags of varying classification. By way of example, the authentication module 201 can facilitate a login process for enabling a user to access a contact list maintained by a social networking service provider or customer relationship management service. The tag assignment module 203 then assign tags to various users within the contact list accordingly. Also of note, the tag assignment module 203 may operate in connection with the communication module 209 to enable establishment of communication sessions based on the selection of one of the assigned tags via an application. For example, when a contact identifier is assigned/associated with five different tags per the tag assignment module 203—each tag representing a different classification—the communication module 209 is caused to initiate the session based on contact data associated with only the selected tag (e.g., work e-mail address versus personal e-mail address).

In one embodiment, a tag correlation module 205 is configured to determine a correlation between one or more contact identifiers, one or more tags of differing classifications, or a combination thereof based on various criteria, rules or corollary models. By way of example, the tag correlation module 205 can perform a comparison between a tag assigned to a resource such as a conference bridge or virtual meeting workspace against tags associated with one or more individuals specified in a contact list to determine affinity between the contact identifiers and/or tags. As another example, the tag correlation module 205 may determine a correlation exists between a tag of a contact to be communicated with via a communication application (e.g., email editor) and another contact not similarly tagged, but copied on previous communications.

As noted in the above example, the tag correlation module 205 may also employ history data for enabling a correlation to be made between respective data sets. In another example, the tag correlation module can review the call history data maintained by a phone or conferencing application to distinguish between contact identifiers called during and after business hours, or based on differing area codes, or based on different dial parameters (e.g., internal dialed extension versus external full entry of a phone number). Analysis of such parameters enables the tag correlation module 205 to determine which contact identifiers, for examples, are work related, customer related, vendor related, personal, etc. It is noted that the tag correlation module 205 may employ various contextual information for performing comparison and matching (e.g., e-mail domains, IP addresses) as well as employ different statistical, event based and/or rating based correlation techniques.

In one embodiment, a tag recommendation module 207 is configured to recommend the assignment of one or more tags, of differing classification, to a specific contact identifier based on a determined correlation. The recommendation may be based on any of the above described or future correlation techniques performed by the tag correlation module 205. For example, the tag recommendation module 207 can cause presentment of a prompt to a display of a user device 101 in response to a correlation between one or more tagged contact identifiers specified to be recipients of an e-mail message. Under this scenario, the tag recommendation module 207 recommends a "Co-worker" tag and/or "Engineering" be applied to/associated with the contact identifier of an independent contractor (tagged as "Contractor") that regularly interacts with or is included on e-mail communications sent to the same co-workers in the engineering department. In another example, the tag recommendation module 207 recommends one or more general categories of tags based on a determined correlation between the user of a user device 101 and an online contact list. Under this scenario, the tag recommendation module 207 recommends a "Social Network" tag be added to each of the contacts maintained in a user's social network service account.

The tag recommendation module 207 may be configured to present recommendations/suggestions to a user device 101a-10 by email, SMS, tag management and other applications based on the correlations found in associated data sets. Specifics of which tags are recommended may also depend on other contextual information such as email domains.

In certain embodiments, the above described functions of the tag assignment module 203, tag correlation module 205 and tag recommendation module 207 are configured to operate on imported contact list data as well. For example, when one application is importing or merging contact data maintained according to a data structure of another application, the tag correlation module 205 may perform data mapping and translation techniques for assessing correlations between the various data fields of the different applications. As part of the importation or merge process, the tag assignment module 203 can prompt the user to assign a tag to a specific set of contact data that cannot automatically be resolved through mapping. Alternatively, the tag recommendation module 207 may recommend a particular tag be added to a specific contact identifier based on a category or field used in the other application from which the data is being retrieved. It is noted, therefore, that modules 203-207 may execute in connection with an application 117 of the user device for supporting extract, transform and load (ETL) processing.

Also, in one embodiment, a controller module 211 is configured to regulate the communication processes between the various other modules for generating and associating tags representing different classifications to a single contact identifier. For example, the controller module 211 generates the appropriate signals to control the communication module 209 for facilitating transmission of data over the network 109. The controller module may also operate in connection with the various modules 203-207 for initiating and enabling the storage of tag data 107 with respect to a given contact identifier.

The mechanism for conveniently associating multiple tags of varying classification with a contact identifier maintained by in a contact list made available by one or more user devices 101a-101n is explained as follows.

Figure 3A:
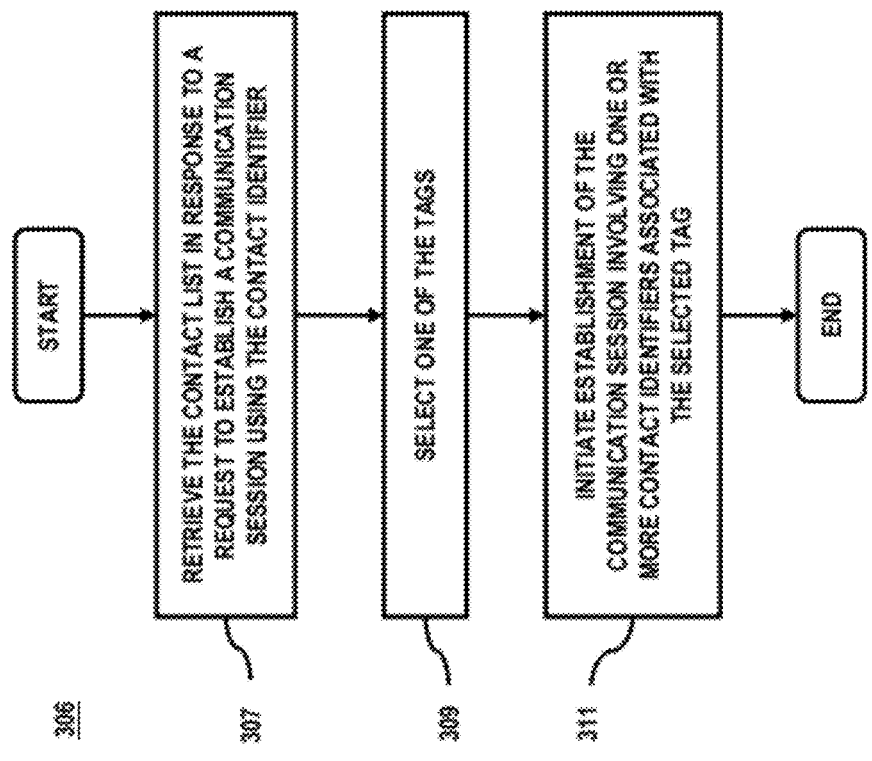
FIGS. 3A-3C are flowcharts of a process for enabling multiple tag associations to be used for classifying a contact identifier, according to various embodiments.
Figure 3B:
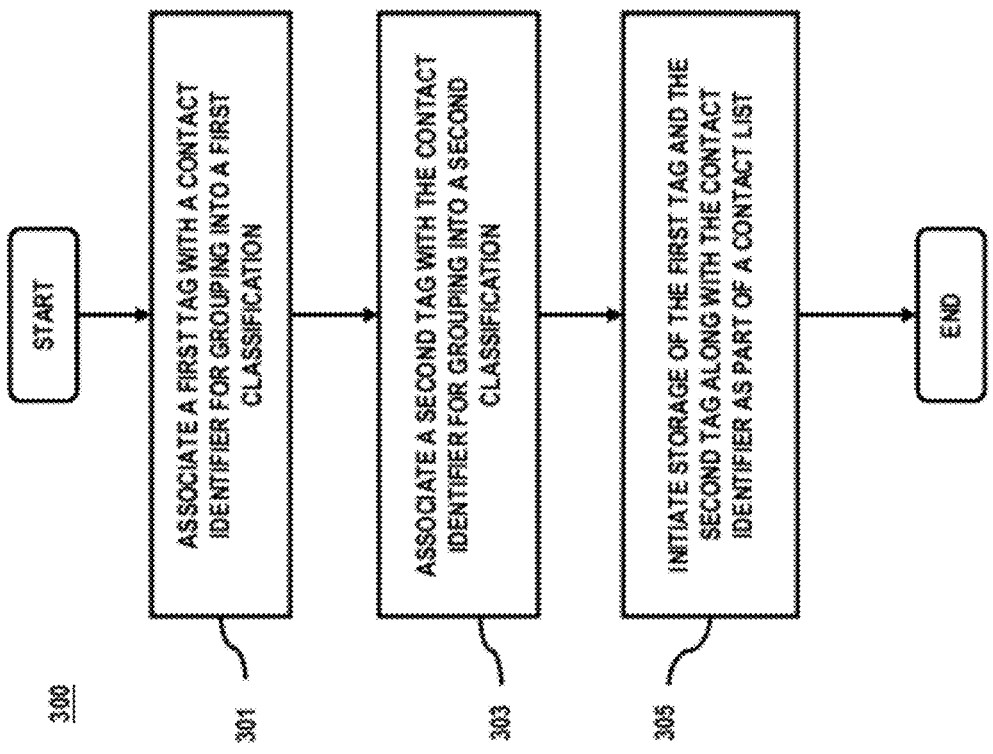
Figure 3C:
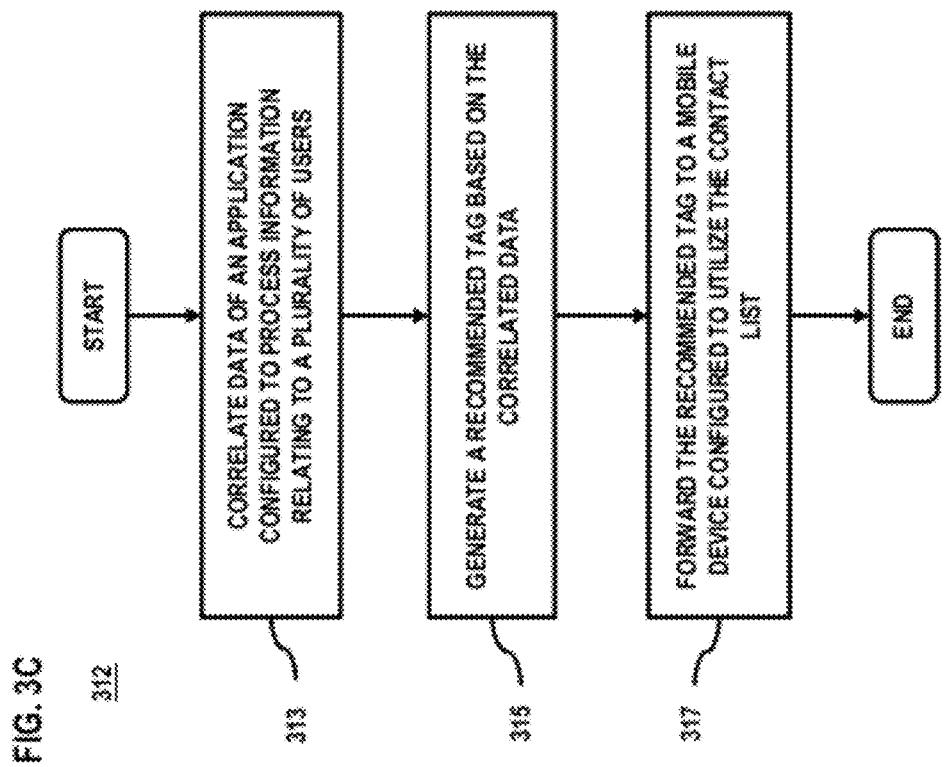
Figure 6:
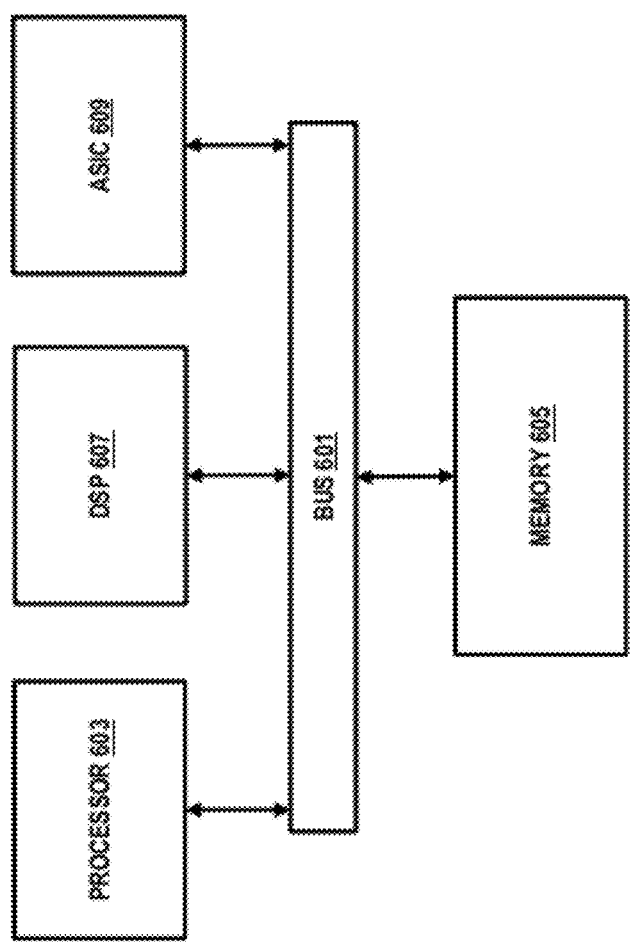
FIG. 6 is a diagram of a chip set that can be used to implement an embodiment of the invention.

FIGS. 3A-3C are flowcharts of a process for enabling multiple tag associations to be used for classifying a contact identifier, according to various embodiments. In one embodiment, the tag management platform 103 performs processes 300, 306 and 312 and is implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner.

As seen in FIG. 3A, process 300, per step 301, associates a first tag with a contact identifier for grouping into a first classification. As mentioned, the classification enables the contact identifier to be grouped according to function, role, skill set, title, activity, resource type, etc. In certain instances, the first tag may be a tag common to multiple users representing different contact identifiers comprising a common group. The tag management platform 103 may also recommend the first tag, such as based on a determined correlation between one or more of the contact identifiers classified via the same tag.

In step 303, the tag management platform 103 associates a second tag with the contact identifier for grouping into a second classification. Per step 305, the tag management platform 103 initiates storage of the first and second tag along with the contact identifier as part of the contact list. As mentioned, storage of the contact list (e.g., contact data 105) by way of multiple different tags enables retrieval of the related contact identifier by a calling application 117a-117n through direct reference to the first tag, second tag or both.

As seen in FIG. 3B, process 306, per step 307, the tag management platform 103 retrieves the contract list in response to a request to establish a communication session using the contact identifier. By way of example, a user of an email or chat application for which the tag management platform 103 is configured may access a contact list comprising one or more contact identifiers—of which one or more of the identifiers include or are associated with at least a first and second tag of different classifications. In step 309, module 203 process 306 facilitates selection of at least one of the tags associated with the contact identifier. Per step 311, a communication session is initiated involving one or more contact identifiers associated with the selected tag. For example, only the contact identifiers associated with the "Football" tag, representing those who participate in the office fantasy football contest, are able to receive an email communication.

In FIG. 3C, process 312, per step 313, correlates data of an application configured to process information relating to a plurality of users. Applications for processing information related to a plurality of users may include an email application, social networking application, phone or web conferencing application and other tools and utilities for supporting network communication, group interaction, data sharing, etc. In the case of a conferencing application, for example, it may be configured to initiate a conference communication session according to the first tag and the second tag. Likewise, the email application or social networking application may be configured to initiate a communication session according to the first and second tag. In the case of a photo sharing application, graphic data may be recalled, presented or shared according to the first tag and second tag.

Per step 315, a recommended tag is generated based on the correlated data. As noted before, the correlation process may be performed based on contextual, historical or other data between respective data sets capable of process by an application. In certain embodiments, it is contemplated that messaging content may also be employed for determining a correlation between a specific contact identifier and a tag. For example, regularly transmitted email messages by a Chief Financial Officer (CFO) of a company pertaining to the general subject of "Company End of Quarter Fiscal Report" may be correlated to contact identifiers with a "Finance," "Accounting," and/or "Executive Leadership" tag. As such, only contact identifiers indicating this tag are correlated when the CFO types in the subject line of the e-mail or attempt to attach the report.

In step 317, process 312 forwards the recommended tag to a mobile device 101a-101n configured to utilize the contact list, such as by way of an application 117. In certain embodiments, given the proper permission, access and configuration settings, it is also contemplated that the tag may be forwarded to a contact list maintained at an on-line repository, such as via an online social networking site.

FIGS. 4A-4E are diagrams of user interfaces for enabling multiple tag associations to be used for classifying a contact identifier, according to various embodiments. For the purpose of illustration, the diagrams are described with respect to an exemplary use case of a device user accessing a contact list to enable a communication session between them and one or more other device users. In this example, the device user (Jenny) maintains a contact list comprising one or more contact identifiers and/or associated tags configured as shown in the contact identifier configuration table (Table 1) below.

TABLE 1

| Name (Contact ID): | Tag | | | | | | | | |
|---|---|---|---|---|---|---|---|---|---|
| | Friend | Work | Family | Programmer | Legal | Security | Paramedic | Softball | My Girls |
| Adam | | | x | x | | | x | x | |
| Barbara | | x | | | x | | | | |
| Charlie | | x | | x | | x | | | |
| Donna | | | x | | x | | x | x | x |
| Edward | x | x | | x | | | | | |
| Fiona | x | | x | | | | | x | x |
| Gary | | | | | | x | x | x | |
| Helen | x | x | | x | | x | | x | x |

Jenny also has access to a conference bridge that is configured for access within her contact list according to the parameters shown in conference bridge configuration table (Table 2) below. It is noted that the conference bridge represents a resource or asset useable in connection with a communication, group interaction or data sharing application operable by way of Jenny's smartphone 400, laptop computer 450 or other user device.

TABLE 2

| Name (Contact ID): | Tag | | | | | | | | |
|---|---|---|---|---|---|---|---|---|---|
| | Friend | Work | Family | Programmer | Legal | Security | Paramedic | Softball | My Girls |
| IT Bridge | | x | | | | | | | |
| Staff Call | | x | | | | | | | |
| Rescue Squad | | | | | | | | x | |

In the foregoing examples, it is noted that while the user interface depictions correspond to the process of associating multiple tags of differing classification to a contact identifier, the devices may be configured to cause presentment of various additional screens based on interaction of devices with the tag management platform 103.

Figure 4A:
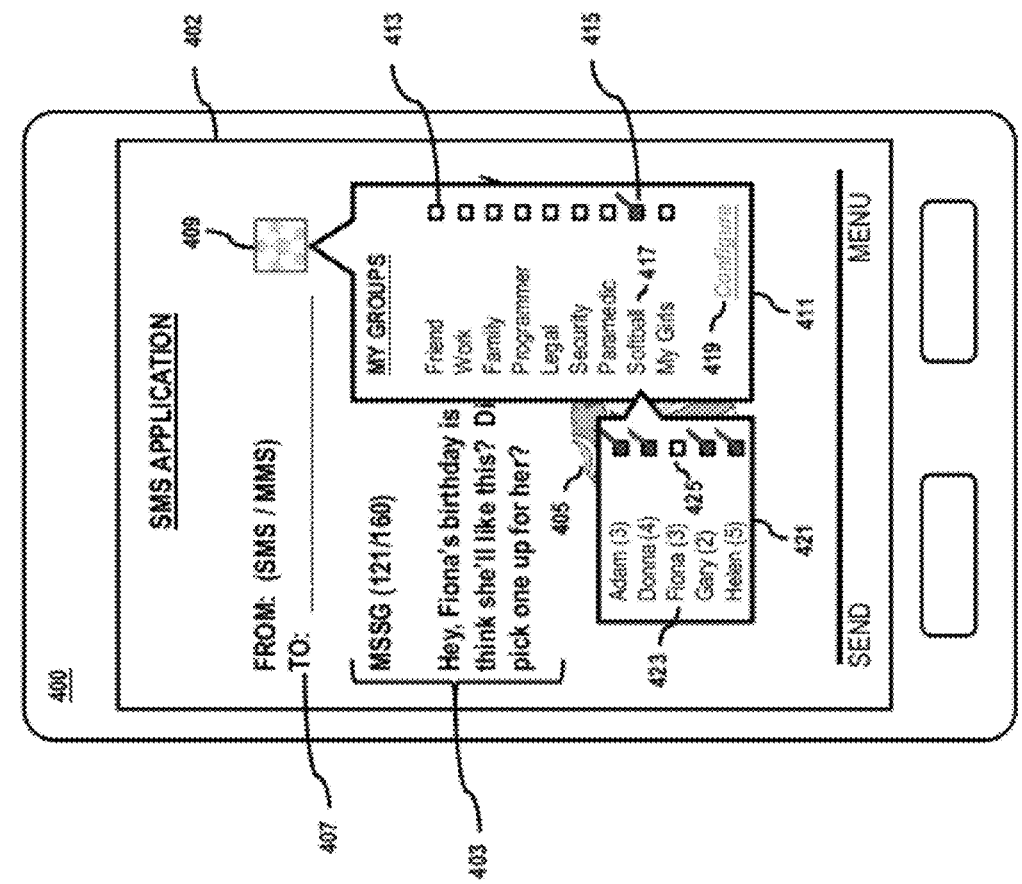
FIGS. 4A-4F are diagrams of user interfaces for enabling multiple tag associations to be used for classifying a contact identifier, according to various embodiments.

FIG. 4A depicts a display of a user device 400 for enabling the use of tags. For the purposes of illustration, a scenario is described for a user, Jenny, who activates her wireless communication device (e.g., smartphone 400) to render an SMS application to the device display 402 for constructing a message 403 and initiating a communication session. The communication session is intended for members of her recreational softball team regarding a teammate (Fiona's) upcoming birthday. While shopping, Jenny finds a softball jersey with the name of Fiona's college on it, snaps a picture 405 of the jersey, then attaches the picture into the body of the text message (or alternatively as a downloadable attachment). The message 403 is an inquiry as to whether others think Fiona would like the jersey and if anyone else already picked up such an item. While there are numerous contact identifiers available for selection from Jenny's contact list (Table 1), she wants to limit the message to only those belonging to the softball team, i.e., only indicating those contacts at the recipient data entry field 407.

Rather than enter the recipients one at a time, Jenny selects a tag presentment icon or action button 409. The tag presentment icon or action button 409 enables the tag management platform 103 to present via the SMS application a "My Groups" listing 411 of the various tags (groups/classifications) configured by Jenny per Table 1. The listing also features various check boxes (e.g., check box 413) for enabling Jenny to select or deselect a particular tag to apply. Under this scenario, Jenny selects the checkbox 415 for specifying the "Softball" tag 417 to make her initial selection of recipients—i.e., everyone on the same recreational softball team as herself and Fiona.

Jenny can also mouse-over, hold, tap, click or otherwise select the "Softball" tag 417 to reveal a contact identifier listing 421 that indicates the various contacts that comprise the "Softball" tag or group. Next to each contact identifier is a reference for indicating the number of other tags or groups to which the contact identifier is associated. For example, the contact identifier 423 for Fiona is shown with a tag count indicator "(3)" next to it for indicating this identifier 423 is also associated with 3 other tags, per Table 1, aside from the "Softball" tag 417. Although not shown, Jenny can also select the tag count indicator to be presented with a list of the other tags to which Fiona is associated.

By default, all contact identifiers associated with the "Softball" tag are checked, indicating they are to be entered as recipients 407 of the message 403. As the message 403 is not intended for Fiona, however, Jenny deselects the checkbox 425 corresponding to Fiona's contact identifier 423. It is noted that the checkboxes (e.g., 413, 425) enable Jenny to include/exclude, contact identifiers at her leisure or auto-populate the recipients list with all associated names. Also, Jenny may also be presented via the listing 411a "Configure" link 419 or action button for enabling her to update her contact list. In certain embodiments, while not shown, this may include presentment of a configurable/interactive Table 1 to the display 402, wherein a user is given the ability to add or delete users, define additional tags/groups or sub-tags/groups, edit contact identifiers (e.g., Names), etc.

Figure 4B:
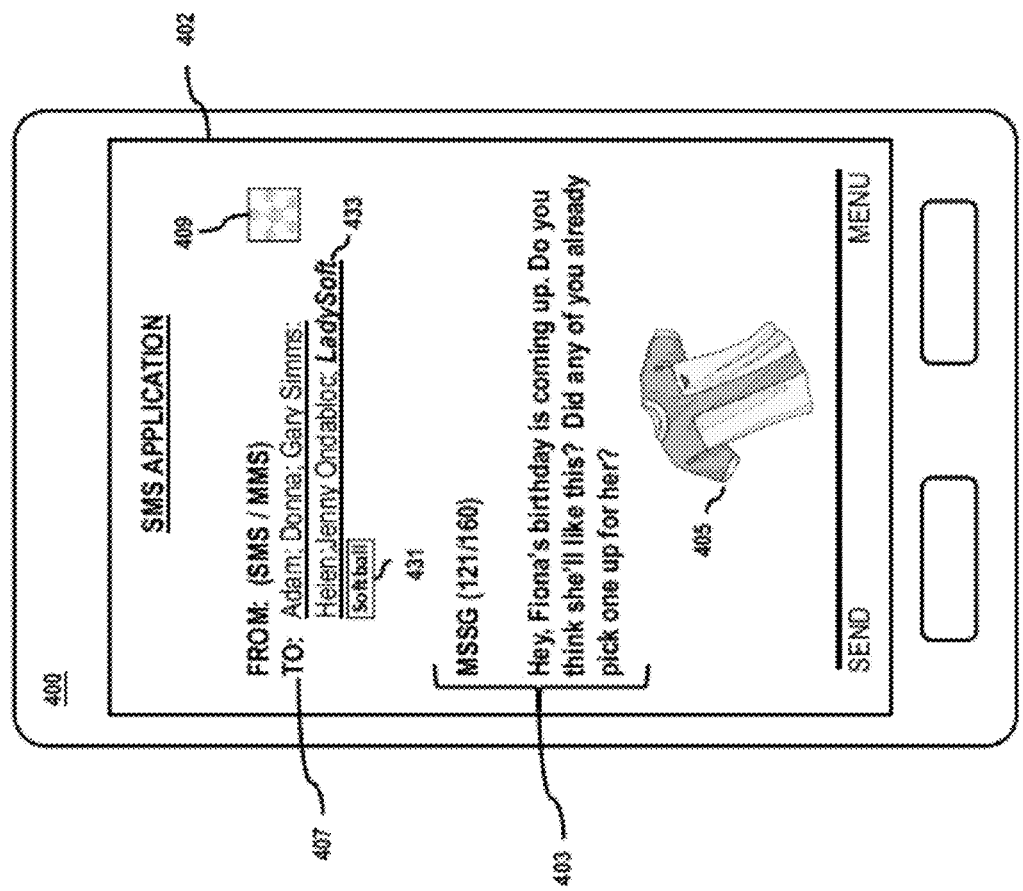
Figure 4C:
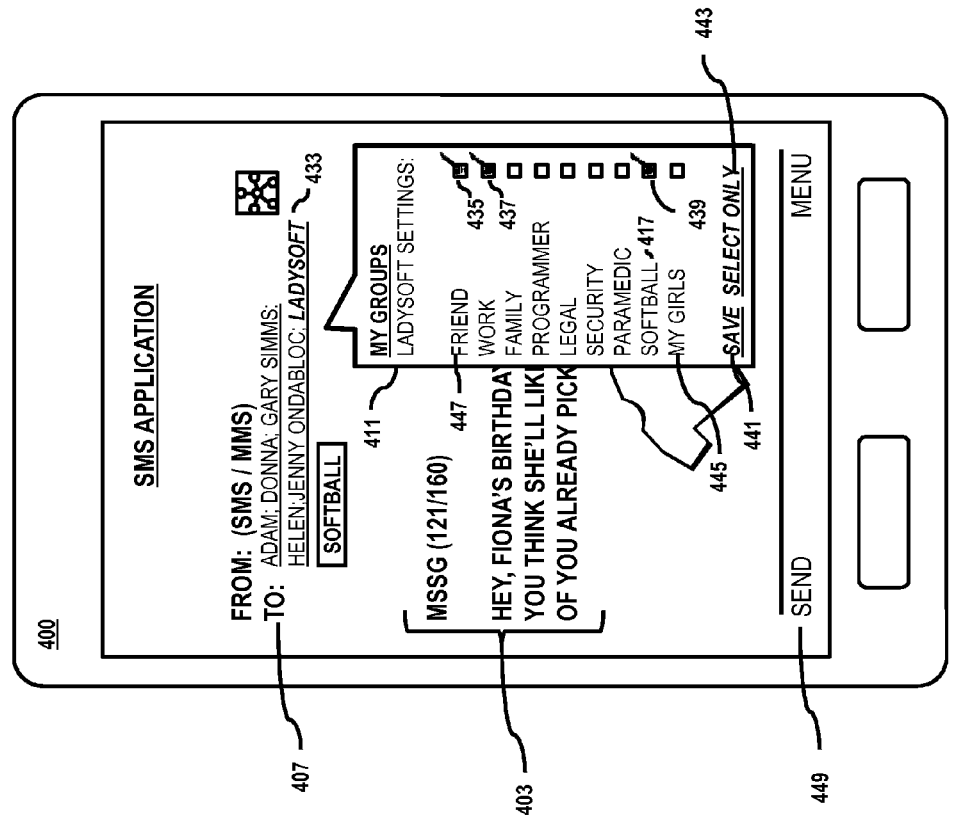

FIG. 4B depicts the completed SMS message with all of Jenny's selected contact identifiers being presented as recipients at the recipient data entry field 403. A tag indicator 431 is also shown in connection with the recipients 403 for indicating the specific tag associations that are common to the group. Before sending the message, Jenny also remembers that she needs to include a co-worker, friend and new member of the softball team named "LadySoft" to the recipient list. Jenny creates a contact identifier 433 for LadySoft, which updates Table 1 (not shown), and the identifier 433 gets added to the recipient data entry field 407 accordingly. As the contact identifier 433 for LadySoft has yet to be associated with any tags, the tag management platform 103 of the device 400 provides an indication that this identifier 433 has yet to be associated with any tags (e.g., no correlation determined, no recommendation available, too new, etc.). In this example, the indicator is a highlighting of the contact identifier 433 for LadySoft although other approaches may be similarly implemented. Jenny can ignore the indication and tag the contact identifier 433 at a later time, or she can perform a mouse-over, hold, tap or click of the identifier 433 to enable viewing of an unchecked/unselected "My Groups" listing 411 for associating tags with LadySoft, as depicted in FIG. 4C.

Jenny selects check boxes 435, 437 and 439 associated with the Friend, Work and Softball tags accordingly, then she selects the "Save" link 441 to save each of these tag classifications with the single contact identifier 433 for LadySoft. This results in updating of the contact identifier configuration table (Table 1—not shown), and also removes highlighting of the contact identifier 433 pertaining to LadySoft as the identifier 433 is now associated with the "Softball" tag/group. While the "My Groups" listing 411 is active, Jenny also activates the "Select Only" link 443 for enabling selection of the tag for the identifier 433 that is to correspond to the SMS message 403 (e.g., select only the "Softball" tag 417). Jenny then selects the "SEND" button 449 for transmitting the message to the various individuals associated with the contact identifiers in the recipients list 407.

It is noted that various other means of assigning tags to a contact identifier are possible. Furthermore, in certain embodiments, it is contemplated that the tag management platform 103 may render to the display via an application various additional menu items, buttons, etc. for enabling selection and generation of nested or sub-tags. For example, the "My Groups" listing 411 may present the "My Girls" tag 445 as a sub-tag of a more broadly classified "Friend" tag 447. Under this scenario, selection of the "My Girls" tag 445 automatically results in selection of the "Friend" tag 447.

Figure 4D:
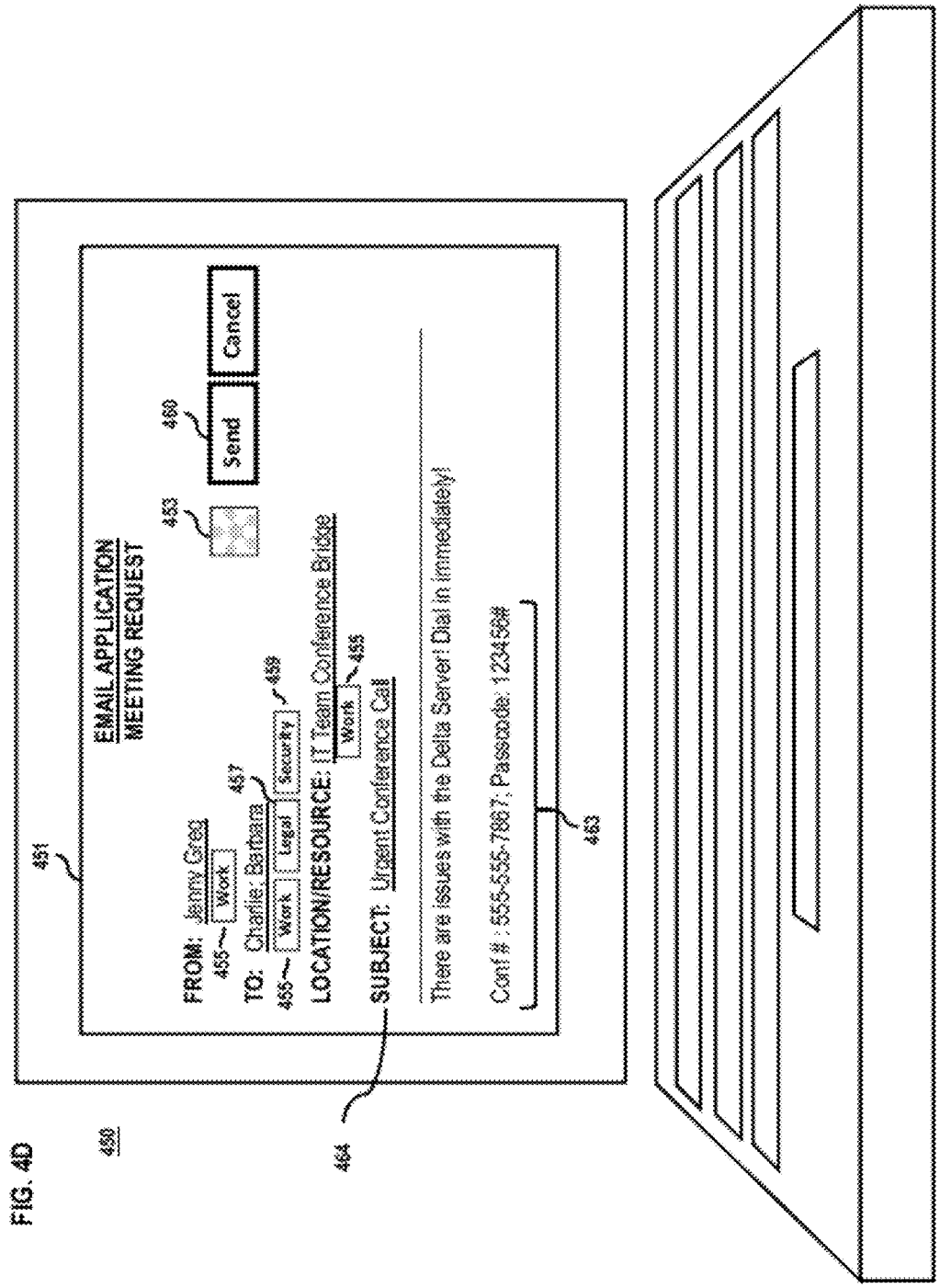

FIG. 4D shows a wireless laptop computing device 450 belonging to Jenny. While Jenny is taking the bus on her way home, she decides to login to the network of her company where she serves as Network Infrastructure Director. Network access is provided by way of her smartphone 400, which acts as a wireless modem. Her computer is also configured with a phone application for enabling her to control her phone directly from her laptop as well as place and receive calls.

Jenny receives an alert by way of e-mail asking her to join a conference bridge (IT Bridge per Table 2) due to a malfunction with a server. Jenny uses her hands-free device (e.g., Bluetooth handset) to voice-dial the IT bridge with the "Work" tag associated with it. While on the bridge, she learns that the system is behaving strangely because it has been hacked. Also, she learns via the call that there is a breach of sensitive information by the hackers, which requires her to notify the affected parties based on state and federal laws. She accesses an email application at her laptop computer 450, which is rendered to a display 451, and proceeds to generate a urgent meeting request 464. Jenny activates a tag presentment icon or action button 453 of the email application for selecting only those individuals most relevant to addressing the server problem. Under this scenario, Jenny selects recipients whose contact identifiers are associated with the "Legal" tag 457 and "Security" tag 459, corresponding to Barbara and Charlie respectively. The recipients are also restricted by way of the tags to only those associated with the "Work" tag 455. Consequently, the message for requesting a meeting and indicating conference call dial-in information 463 stays within her company. Neither Donna, an attorney also associated with the "Legal" tag 457, nor Gary, a network security engineer who works outside of her company that is also associated with the "Security" tag 459, receives the meeting request upon activation of the "Send" action button 460.

In certain embodiments, tags may be suggested based on the context or general usage of the application in question. For example, when Jenny accesses a Work related e-mail app for establishing a meeting, the application can be configured to automatically assume that contacts being selected are to be "Work" tagged contacts as opposed to any other classification. By way of example, contacts associated with the "Work" tag are presented or recommended to the user by default over personal tags, such as "My Girls."

Figure 4E:
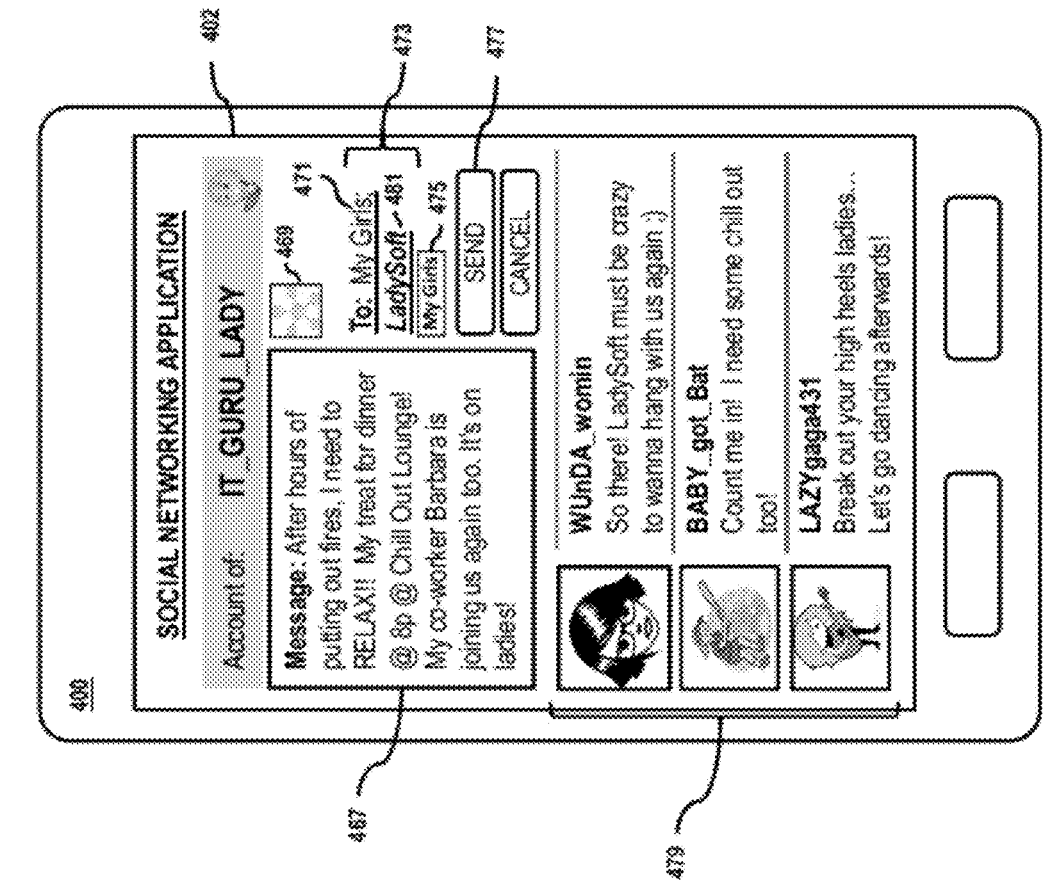
Figure 4F:
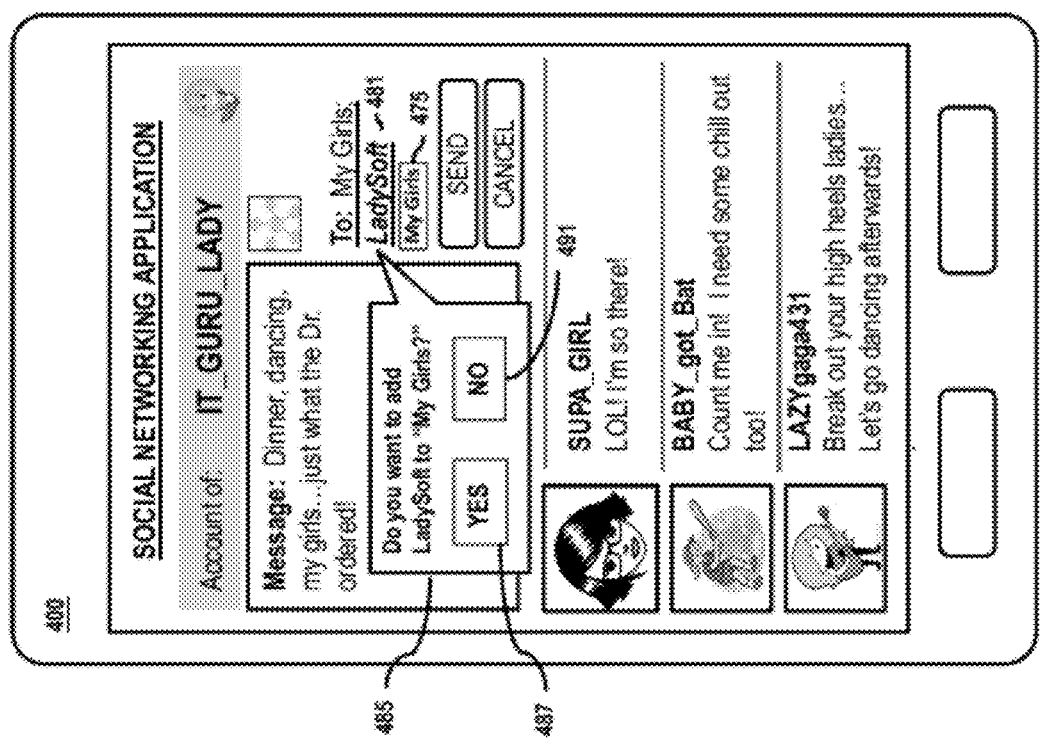

After resolving the work related matter, Jenny accesses her smartphone 400 and launches a social networking application as depicted with respect to FIGS. 4E and 4F. She decides to contact her best friends to coordinate a social activity (e.g., Girls Night Out). After logging into her social networking account, she generates a message 467 then selects the tag presentment icon or action button 469 of the social networking application (e.g., instant chat) in order to select only the those individuals most relevant to attending the social event. Under this scenario, Jenny selects the "My Girls" tag 471 to send out an invite suggesting their usual venue. As a result, "My Girls" is shown to the recipient data entry field 473 or alternatively, the individual contact identifiers of Donna, Fiona and Helen. Also, a tag indicator 475 is shown. Jenny also decides to send the message to her friend and co-worker LadySoft, who is currently not associated with the "My Girls" tag 471 but familiar with the group of friends 479. Upon selecting the "SEND" action button 477, she immediately receives response messages from various of her friends.

As mentioned previously, the contact identifier 481 for LadySoft is highlighted to indicate that the contact identifier 433 for LadySoft has yet to be associated with the My Girls tag. Having determined that LadySoft has been included in prior functions and announcements to the My Girls group (a correlation), the tag management platform 103 renders a recommendation message prompt to the display 402, as depicted in FIG. 4F. The recommendation message 485 queries Jenny if she wants to associate LadySoft with the "My Girls" tag 475 given the determined correlation she shares with the other contact identifiers already tagged as such. Jenny selects the "No" action button 491 to reject the recommendation or "Yes" action button 487 to proceed with the recommendation and remove the highlighting from the contact identifier 481 for LadySoft. The message can then be sent to her friends.

The exemplary techniques and systems presented herein enable multiple tags of different classification and/or sub-tags to be associated with a single contact identifier. This advantageously provides a hierarchical means of tracking contacts within a list as well as supports enhanced accessing of contact identifiers by way of multiple classification types.

The processes described herein for enabling multiple tag associations to be used for classifying a contact identifier may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
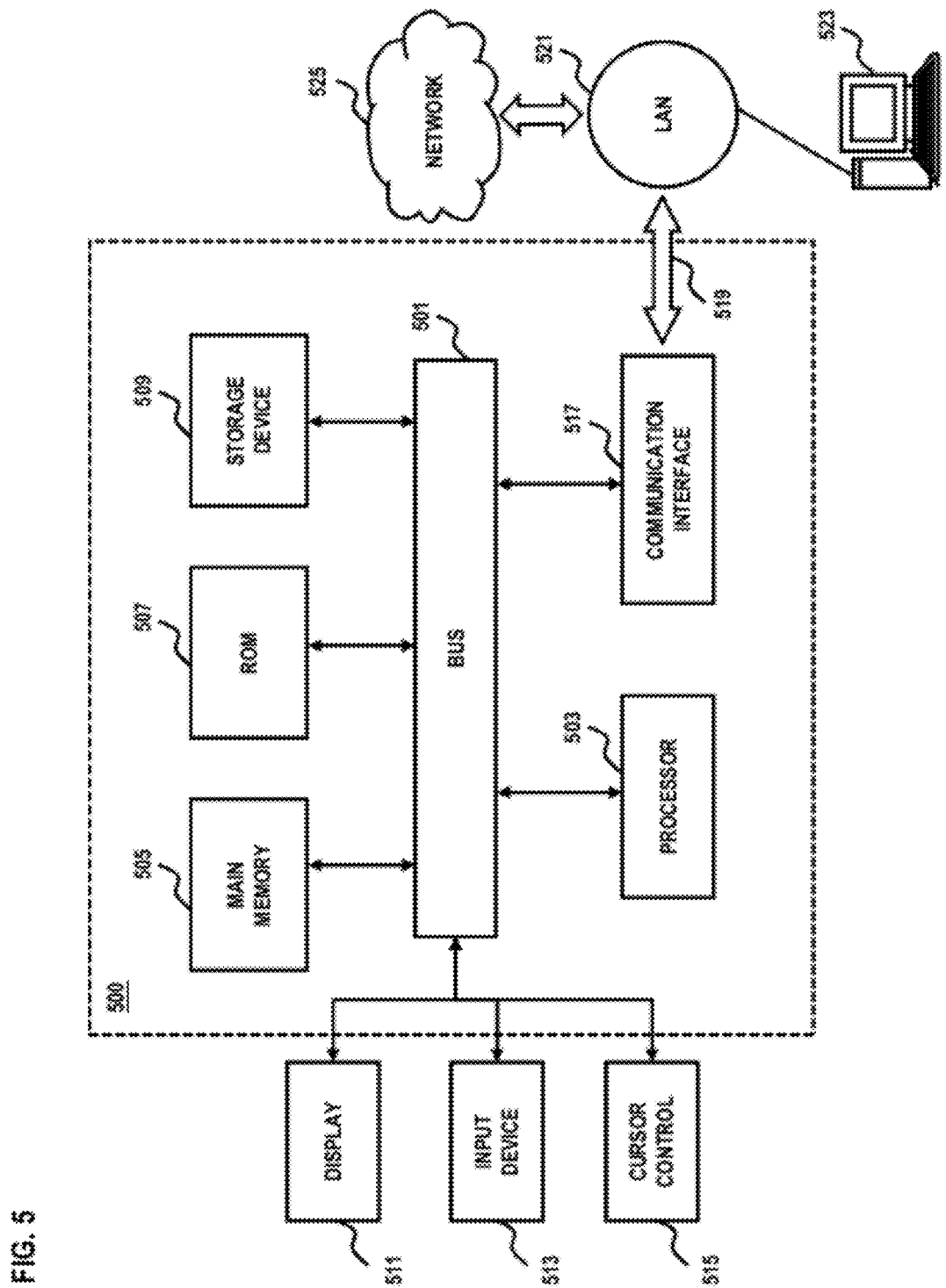
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable multiple tag associations to be used for classifying a contact identifier as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling multiple tag associations to be used for classifying a contact identifier.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable multiple tag associations to be used for classifying a contact identifier. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:
1. A method comprising:
associating, by a processor, a first tag with one or more contact identifiers for grouping into a first classification, wherein the one or more contact identifiers are part of a plurality of contact identifiers in one or more contact lists;

associating a second tag with the one or more contact identifiers for grouping into a second classification;

initiating storage of the first tag and the second tag along with the one or more contact identifiers as part of the one or more contact lists;

presenting a tag list comprising the first tag and the second tag in response to a request to a user to select one or more tags for establishing a communication session;

initiating presenting by the processor every contact identifier of the one or more contact lists having all of the selected one or more tags; and initiating establishment of the communication session with the one or more contact identifiers of the one or more contact lists that is/are presented having all of the selected one or more tags associated therewith, wherein the presentation of every contact identifier of the one or more contact lists having all of the selected one or more tags includes (i) presenting a tag count indicator next to each contact identifier indicating a number of other tags associated with the each contact identifier, and (ii) presenting a check box associated with the each contact identifier, wherein the check box of the each contact identifier is selected by default indicating that the communication session is to be established with that contact identifier, and wherein the user deselects any check box that the user does not intend that the communication session is to be established.

2. A method according to claim 1, further comprising:
correlating data of an application configured to process information relating to a plurality of users; and
generating a recommended tag based on the correlated data.

3. A method according to claim 2, wherein the application includes an email application or a conferencing application.

4. A method according to claim 3, wherein the conferencing application is configured to initiate a conference communication session according to the first tag and the second tag.

5. A method according to claim 2, wherein the application is configured to provide the recommended tag.

6. A method according to claim 2, further comprising:
forwarding the recommended tag to a mobile device configured to utilize the contact list.

7. A method according to claim 1, wherein the contact list is stored at an on-line repository.

8. A method according to claim 1, wherein the first tag is specified by a plurality of users, the first tag being a recommended tag.

9. An apparatus comprising:
at least one processor; and
at least one memory including computer program code for one or more programs, the at least one memory and the computer program code configured to, with the at least one processor, cause the apparatus to perform at least the following,
associate a first tag with one or more contact identifiers for grouping into a first classification, wherein the one or more contact identifiers are part of a plurality of contact identifiers in one or more contact lists;
associate a second tag with the one or more contact identifiers for grouping into a second classification;
initiate storage of the first tag and the second tag along with the one or more contact identifiers as part of the one or more contact lists;

present a tag list comprising the first tag and the second tag in response to a request to a user to select one or more tags for establishing a communication session;

initiate automatic presenting every contact identifier of the one or more contact lists having all of the selected one or more tags; and initiate establishment of the communication session with the one or more contact identifiers of the one or more contact lists that is/are presented having all of the selected one or more tags associated therewith, wherein the presentation of every contact identifier of the one or more contact lists having all of the selected one or more tags includes (i) presenting a tag count indicator next to each contact identifier indicating a number of other tags associated with the each contact identifier, and (ii) presenting a check box associated with the each contact identifier, wherein the check box of the each contact identifier is selected by default indicating that the communication session is to be established with that contact identifier, and wherein the user deselects any check box that the user does not intend that the communication session is to be established.

10. An apparatus according to claim 9, wherein the apparatus is further caused to:
correlate data of an application configured to process information relating to a plurality of users; and
generate a recommended tag based on the correlated data.

11. An apparatus according to claim 10, wherein the application includes an email application or a conferencing application.

12. An apparatus according to claim 11, wherein the conferencing application is configured to initiate a conference communication session according to the first tag and the second tag.

13. An apparatus according to claim 10, wherein the application is configured to provide the recommended tag.

14. An apparatus according to claim 10, wherein the apparatus is further caused to:
forward the recommended tag to a mobile device configured to utilize the contact list.

15. An apparatus according to claim 9, wherein the contact list is stored at an on-line repository.

16. An apparatus according to claim 9, wherein the first tag is specified by a plurality of users, the first tag being a recommended tag.

17. A non-transitory computer-readable storage medium carrying one or more sequences of one or more instructions which, when executed by one or more processors, cause an apparatus to at least perform the following steps:
associating a first tag with one or more contact identifiers for grouping into a first classification, wherein the one or more contact identifiers are part of a plurality of contact identifiers in one or more contact lists;
associating a second tag with the one or more contact identifiers for grouping into a second classification;
initiating storage of the first tag and the second tag along with the one or more contact identifiers as part of the one or more contact lists;
presenting a tag list comprising the first tag and the second tag in response to a request to a user to select one or more tags for establishing a communication session;
initiating automatic presenting every contact identifier of the one or more contact lists having all of the selected one or more tags; and initiating establishment of the communication session with the one or more contact identifiers of the one or more contact lists that is/are presented having all of the selected one or more tags associated therewith, wherein the presentation of every contact identifier of the one or more contact lists having all of the selected one or more tags includes (i) presenting a tag count indicator next to each contact identifier indicating a number of other tags associated with the each contact identifier, and (ii) presenting a check box associated with the each contact identifier, wherein the check box of the each contact identifier is selected by default indicating that the communication session is to be established with that contact identifier, and wherein the user deselects any check box that the user does not intend that the communication session is to be established.

18. A non-transitory computer-readable storage medium of claim 17, wherein the apparatus is caused to further perform:
correlating data of an application configured to process information relating to a plurality of users; and
generating a recommended tag based on the correlated data.

* * * * *